(12) United States Patent
Hanechak

(10) Patent No.: US 8,634,674 B2
(45) Date of Patent: Jan. 21, 2014

(54) DYNAMIC SIZING AND POSITIONING OF MULTIPLE IMAGES

(75) Inventor: Brian D. Hanechak, Waltham, MA (US)

(73) Assignee: VistaPrint Schweiz GmbH, Winterthur (CH)

( * ) Notice: Subject to any disclaimer, the term of this patent is extended or adjusted under 35 U.S.C. 154(b) by 1029 days.

(21) Appl. No.: 11/853,216

(22) Filed: Sep. 11, 2007

(65) Prior Publication Data

US 2009/0067753 A1 Mar. 12, 2009

(51) Int. Cl.
*G06K 9/36* (2006.01)

(52) U.S. Cl.
USPC ......... 382/276; 358/1.15; 358/1.18; 382/284; 382/305; 715/251; 715/723

(58) Field of Classification Search
None
See application file for complete search history.

(56) References Cited

U.S. PATENT DOCUMENTS

| | | | | |
|---|---|---|---|---|
| 6,301,013 | B1 * | 10/2001 | Momose et al. | 358/1.15 |
| 6,453,078 | B2 * | 9/2002 | Bubie et al. | 382/305 |
| 6,636,648 | B2 * | 10/2003 | Loui et al. | 382/284 |
| 6,765,687 | B2 * | 7/2004 | Tanaka et al. | 358/1.18 |
| 6,954,282 | B2 * | 10/2005 | Miyamoto et al. | 358/1.18 |
| 2001/0035875 | A1 * | 11/2001 | Suzuki et al. | 345/723 |
| 2002/0030856 | A1 * | 3/2002 | Kumagai | 358/1.18 |
| 2002/0040375 | A1 * | 4/2002 | Simon et al. | 707/517 |
| 2005/0071783 | A1 | 3/2005 | Atkins | |
| 2007/0024909 | A1 | 2/2007 | Hanechak | |

FOREIGN PATENT DOCUMENTS

WO WO-2006/012685 A 2/2006

OTHER PUBLICATIONS

Atkins C.B.: "Adaptive Photo Collection Page Layout" Image Processing, 2004, pp. 2897-2900, XP010786402, Piscataway, NJ, USA.

* cited by examiner

*Primary Examiner* — Tsung-Yin Tsai
(74) *Attorney, Agent, or Firm* — Jessica Costa

(57) ABSTRACT

A method of arranging images provides for automated scaling, positioning and organizing of a plurality of images on an image display, which may be transferred to a printed or electronic product design. A plurality of images are analyzed to produce image data. Display parameters determine permissible arrangement of the images. Based on the image data and the display parameters, an arrangement on the image display for each of the plurality of images is defined. The arrangement may be further defined to maximize at least one dimension of the images.

20 Claims, 11 Drawing Sheets

DYNAMIC SIZING AND POSITIONING OF MULTIPLE IMAGES

BACKGROUND OF THE INVENTION

Many individuals and businesses occasionally have a need for printed materials such as party invitations, announcements of special events, holiday cards, or any number of other items. Rather than settle for off-the-shelf, generic designs, many customers for these types of products wish to personalize the product by incorporating personal images into the product design, such as photographs of family members or other images of particular interest or relevance to the customer.

Some of these individuals and businesses turn to traditional sources such as a local print shop for assistance in preparing customized materials. As an alternative, many people today choose to prepare their own custom designs using a Web-based printing service site, such as VistaPrint.com, that offers users the ability to access the site from the user's home or office and design a personalized product using document design tools and services provided by the site. Printing services Web sites typically provide their customers with the ability to select a desired product template from variety of pre-designed templates, incorporate text and images to create a customized design, and then place an order for production and delivery of a desired quantity of the product. Similar automated services are occasionally provided on-site at print or photo shops.

Prior online tools and techniques for incorporating user images into electronic designs generally fall into two broad categories. In some cases, the layout selected by the user for customization has been designed by the printing service provider to contain one or more defined image containers into which uploaded images will be placed. These image containers typically have fixed dimensions and a fixed position in the overall layout. In order to produce the selected layout with the user's images, only a fixed number of images may be implemented into the layout, and the images may need to be cropped or distorted to accommodate the defined image containers.

Another prior technique for allowing a user to incorporate images into a product design is to initially place all user-provided images at a default size at the same default location. This technique places the burden of manually resizing and repositioning images in the design completely on the user.

The aforementioned techniques for incorporating images into a product design have several disadvantages. In layouts having defined image containers, user preference is constrained by the number, size and aspect ratio of the image containers. If an ideal layout is not available, a user must tolerate a layout that displays more or fewer images than desired, or requires cropping or distorting some images to fit within the image containers. Conversely, techniques providing manual positioning controls are time-consuming for the user, and rely on the user to create a satisfactory design.

SUMMARY OF THE INVENTION

Embodiments of the present invention provide a computer-implemented method of producing an image display having multiple images. In such embodiments, a number of selected images are analyzed to produce image data. The image data may include dimensions of each of the selected images, such as height, width and area, or other information. For a particular layout, display parameters provide initial constraints on how the images may be arranged within the display area. Based on the image data and display parameters, embodiments of the present invention define an arrangement within the display area for the selected images such that the display parameters are satisfied. The arrangement may be defined further to maximize at least one dimension of the selected images.

In further embodiments of the invention, the arrangement may be defined via attributes for each of the selected images relative to the display area, such as scale, position and rotation. The arrangement may be defined by producing a number of arrangements under the display parameters, and then selecting the arrangement having a maximum dimension of the selected images. For example, the selected arrangement may be optimized for size of the selected images, such that the selected images occupy the greatest area within the display area. The arrangement may further maintain the aspect ratio of each of the selected images.

In still further embodiments of the present invention, each selected image may be scaled according to the display parameters, and then arranging the scaled images, independent of the display area, such that the display parameters are satisfied. The arrangement may then be scaled to fit within the display area of a design product.

Display parameters for the image display may include a number of rows or columns in which to arrange the images, minimum or maximum overlap among images, degrees of rotation, frames encompassing one or more images, alignment to an axis or other geometry, relative scale among images, or other constraints. Such parameters may have definite (certain) values or a range of values from which a value is selected.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

Figure 1:
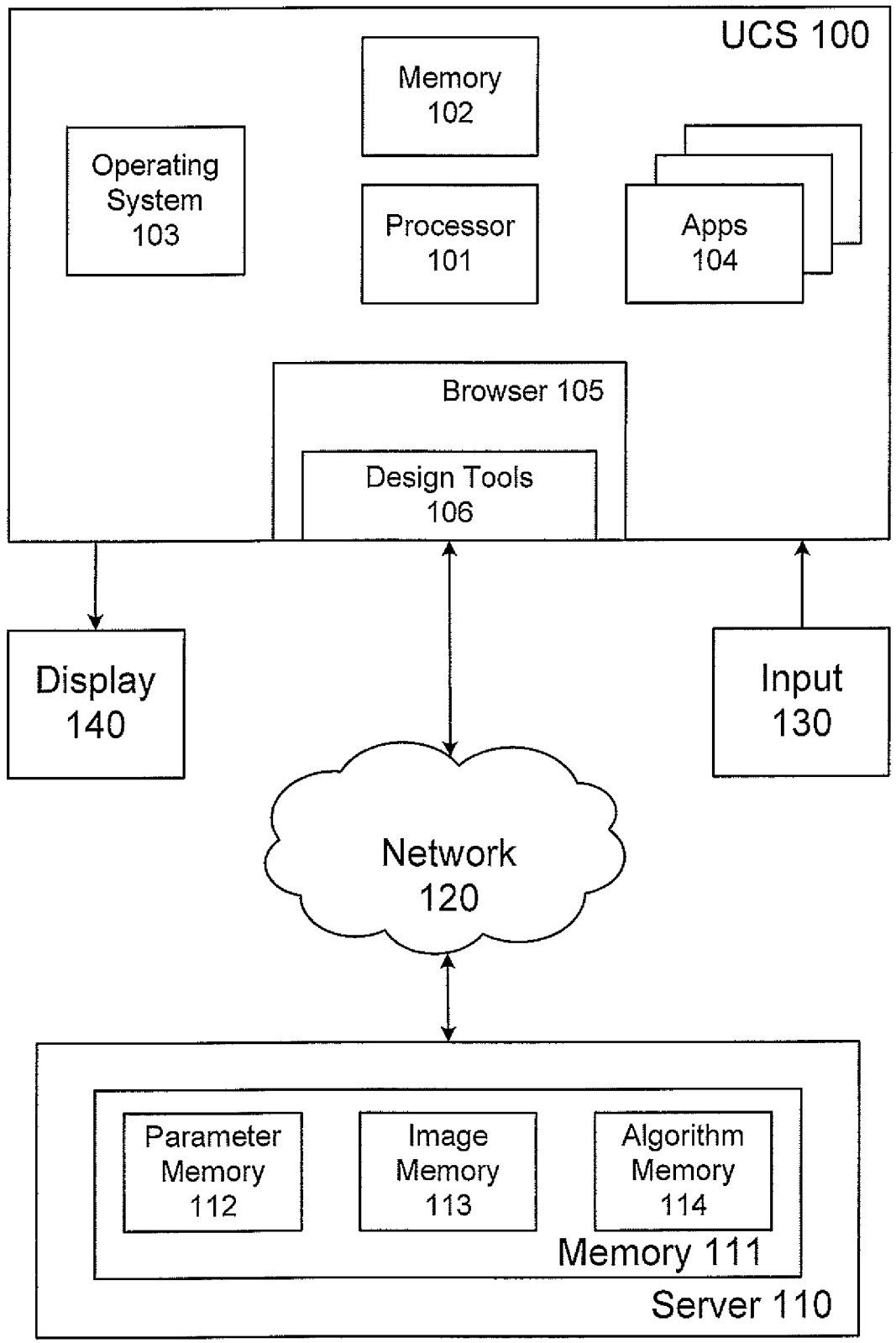
FIG. 1 is a block diagram of a computer system in which embodiments of the invention may be implemented.

FIG. 1 illustrates an exemplary user computer system (UCS) 100 in which embodiments of the present invention may be implemented. UCS 100 includes processor 101 and memory 102. Memory 102 represents all UCS 100 components and subsystems that provide data storage, such as RAM, ROM, and hard drives. In addition to providing permanent storage for all programs installed on UCS 100, memory 102 also provides temporary storage required by the operating system and the applications while they are executing. In a preferred embodiment, UCS 100 is a typically equipped personal computer, but UCS 100 could also be a portable computer, a tablet computer, or other device. The user views images from UCS 100 on display 140, such as a CRT or LCD screen, and provides inputs to UCS 100 via input devices 130, such as a keyboard and a mouse.

When UCS 100 is operating, an instance of the UCS 100 operating system will be running, represented in FIG. 1 by operating system 103. In addition, the user may be running one or more application programs Apps 104. In FIG. 1, UCS 100 is running Web browser 105, such as Internet Explorer from Microsoft Corporation. In the depicted embodiment, design tools 106 is a product design program downloaded to UCS 100 via network 120 from remote server 110, such as downloadable design tools provided by VistaPrint Limited and publicly available at vistaprint.com. Design tools 106 runs in browser 105 and exchanges information and instructions with server 110 during a design session to support the user's preparation of a customized product design in electronic form. When the customer is satisfied with the design of the product, the design can saved at server 110 for storage and, if desired by the user, subsequent production of the desired quantity of the physical product on appropriate printing and post-print processing systems.

While server 110 is shown in FIG. 1 as a single block, it will be understood that server 110 could be multiple servers configured to communicate and operate cooperatively to support Web site operations. Server 110 will typically be interacting with many user computer systems, such as UCS 100, simultaneously. Server Memory 111 represents all components and subsystems that provide server data storage, such as RAM, ROM, and disk drives or arrays. Parameter memory 112 represents the portion of server memory 111 containing design parameters and various layouts, designs, colors, fonts, and other information provided by the service provider to enable the creation and rendering of templates. As used in the embodiment described herein, a layout is an XML description that specifies the size, position and other attributes of all product elements such as text containers, image containers, graphics, z-index values and so forth.

Image memory 113 represents the portion of server memory 111 that contains the images provided and used by the service provider in the generation of the product design. In addition, image memory 113 also contains user images uploaded to server 110 by the user of USC 100 and other users. Algorithm memory 114 represents a portion of server memory 111 containing computer-readable instructions for arranging the images, in accordance with the design parameters, to produce a product design containing the images.

Figure 2A:
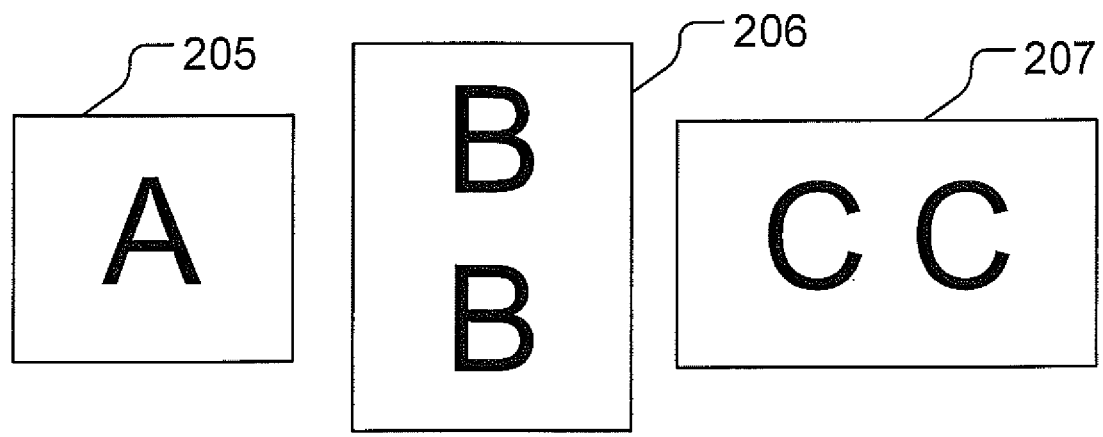
FIG. 2A is a simplified representation of images to be incorporated into a product design.

FIG. 2A is a representation of three images to be inserted into a design template of a prior art product. Image A 205 is an image that is square in shape; image B 206 is rectangular with a height greater than width; and image C 207 is rectangular with a width greater than height.

Figure 2B:
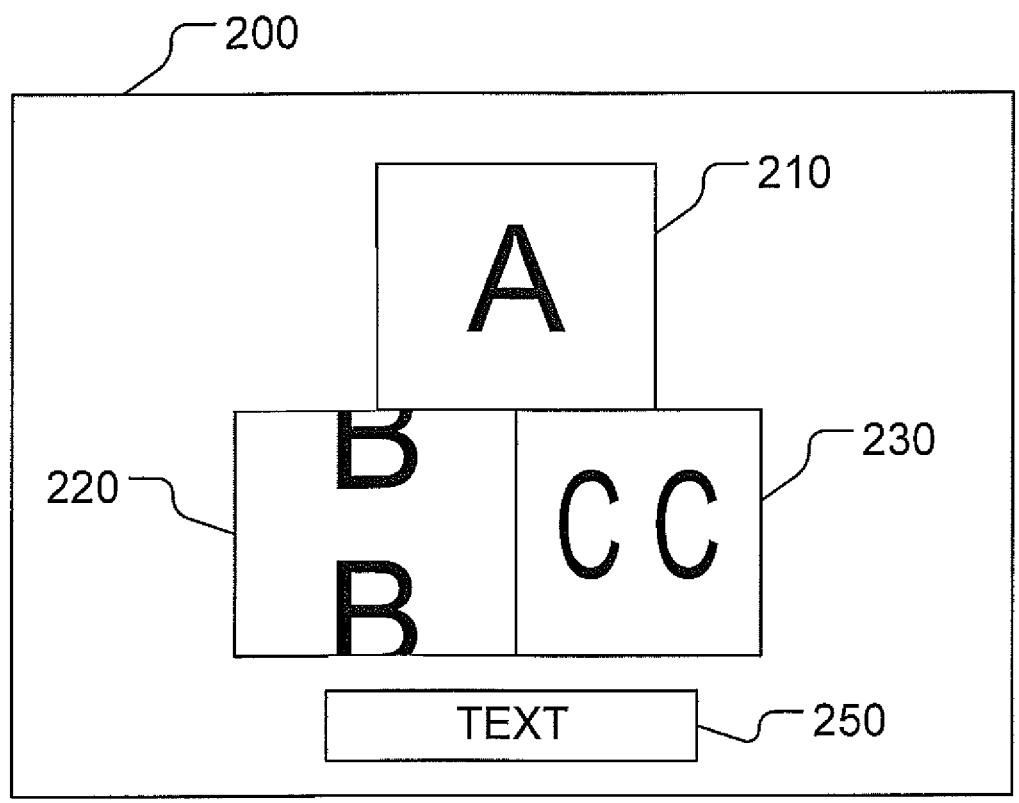
FIG. 2B is a representation of a prior art template for a product design.

FIG. 2B illustrates a prior art template 200 providing an arrangement of images and text on a document. The template 200 includes three image containers 210, 220, 230 having identical sizes and aspect ratios, as well as a text box 250 in which text may be placed. All image containers 210, 220, 230 are fixed in dimension, position and orientation on the template 200.

Images A, B and C 205-207, for example, are shown to be placed into image containers 210, 220 and 230, respectively. A computer application, such as the design tools 106 of FIG. 1, operates to position images to occupy the entire area of each image container 210, 220, 230. However, images A, B and C 205-207 have original sizes and aspect ratios that do not match those of the image containers 210, 220, 230. Thus, the computer application must scale and position each of the images 205-207 relative to the respective image containers 210, 220, 230, Example renderings of the images 205-207 are shown in FIG. 2B. Here, image A 205 has been scaled slightly to occupy the uppermost image container 210. The aspect ratio of original image A 205 matches that of the container 210, and so remains unchanged when scaled to occupy the image container 210. In contrast, original image B 206 has a different aspect ratio than the container 220, and so is cropped by cutting upper and lower portions of the image 206, and placing the remain portion of the image 206 within the image container 220 as shown.

Similarly, the aspect ratio of original image C 207 differs from that of the container 230, and so is scaled, without maintaining its aspect ratio, to fit within the image container 230. Thus, as a result of arranging images A, B and C 205-207 within the template 200, not all images are reproduced correctly: image B 206 is not represented in its entirety, and image C 207 is distorted. A typical prior-art application employing this template 200 either crops (e.g., image B 206) or distorts (e.g., image C 207) all images having aspect ratios different than that of the image containers 210, 220, 230.

Figure 3A:
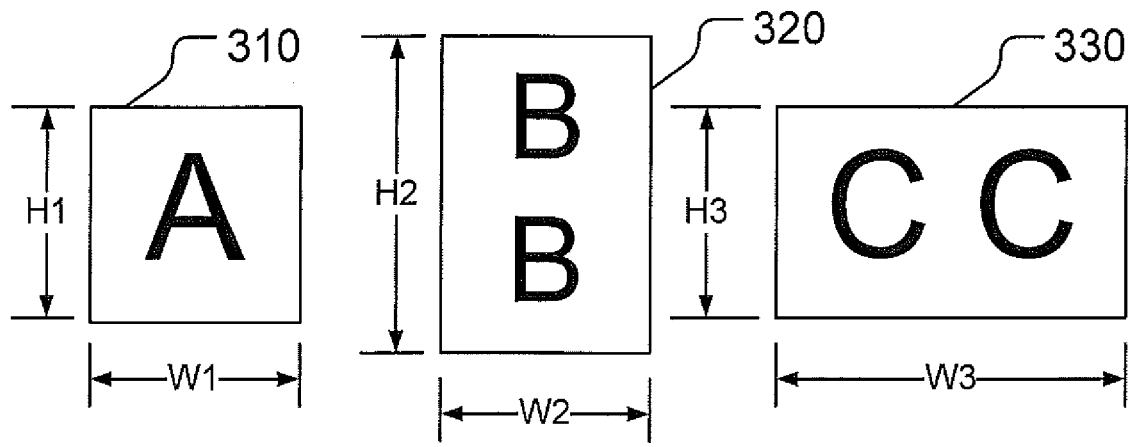
FIG. 3A is a representation of images to be incorporated into an embodiment of the present invention.

FIG. 3A is a representation of three images 310, 320, 330 to be arranged in an image display according to an exemplary embodiment of the present invention. Image A 310 has a square aspect ratio with a height H1 and width W1. Image B 320 has a rectangular aspect ratio with a height H2 and width W2. Image C 330 has a rectangular aspect ratio with a height H3 and width W3.

Figure 3B:
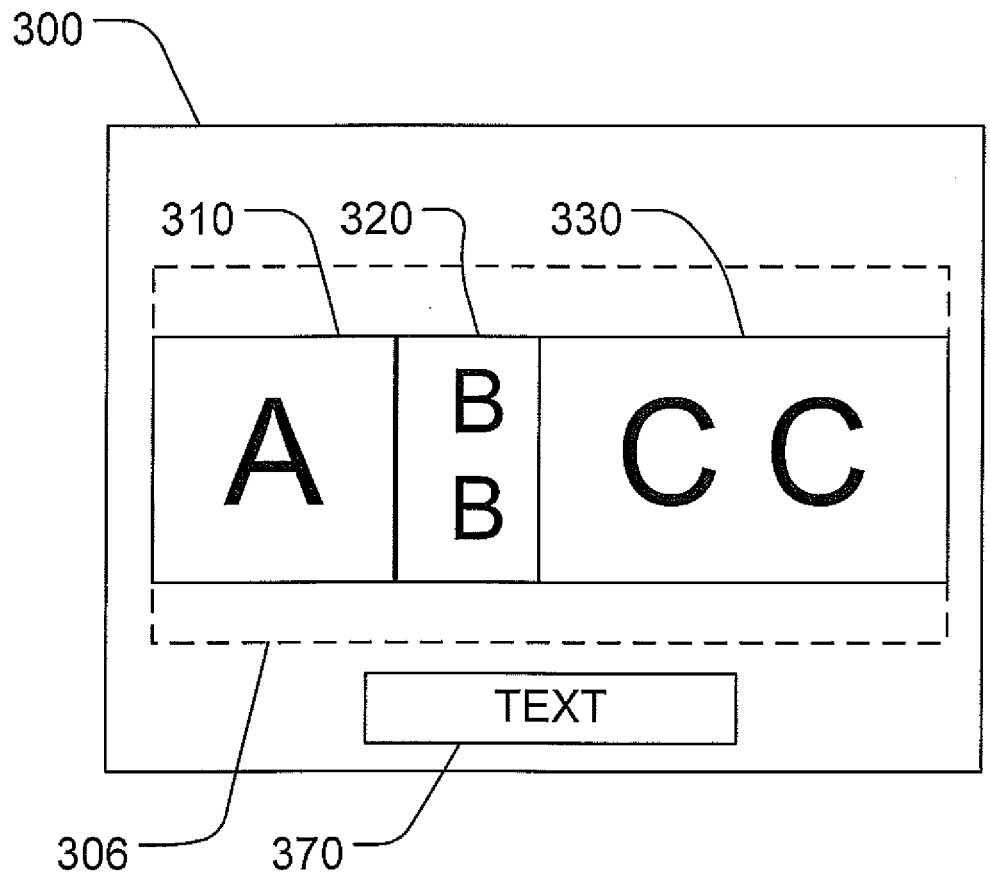
FIG. 3B is a representation of a product design having a horizontal photograph strip produced by an embodiment of the present invention.

FIG. 3B is a representation of an image display 300 having a horizontal photograph strip arrangement produced by an embodiment of the present invention. The image display 300 includes images A, B and C 310, 320, 330 and a text box 370. In contrast to the template 200 in FIG. 2B, the invention image display 300 does not include fixed image containers in which to position the images. Rather, an image area 306 (outlined by a dashed line) defines an area of the image display 300 within which images may be positioned. Because the image display 300 does not dictate fixed dimensions or fixed positions for images, it can accommodate images of a range of quantity, size, aspect ratio and other characteristics.

Given the flexibility of the image area 306, embodiments of the present invention can produce an image arrangement of a given set of images in a number of ways. Therefore, to produce a coherent image arrangement, embodiments of the invention may impose a number of display parameters to narrow the range of possible arrangements. A display parameter, as used herein, refers to any constraint on the ways in which images may be positioned within the image area 306 of an image display 300. Display parameters may include, for example, constraints on the relative width, height or area of each image, alignment of images, number of permissible rows or columns of images, maximum or minimum overlap of images, angle of rotation of the images, or frames encompassing one or more images. As a result of such display parameters, an image arranger implementing an embodiment of the invention may produce an image display with a particular design scheme, as implied by the design parameters.

The image display 300 shown in FIG. 3B is one result of arranging images A, B and C 310, 320, 330 according to an embodiment of the present invention. The sequence of the images from left to right could be automatically chosen or could be based on a particular order of presentation selected by the user. A computer application, such as the design tools 106 in FIG. 1, analyzes each of the images 310, 320, 330 to produce image data, including the respective height and width of each image 310, 320, 330. In order to position the images 310, 320, 330 in a horizontal photo strip as shown in the image display 300, the application imposes a number of display parameters, which may be included in an algorithm or other instructions. Thus, based on the image data, the application defines an arrangement of the images 310, 320, 330 within the display area 306 such that the display parameters are satisfied.

Methods for defining such an arrangement, in general, are described below with respect to FIGS. 4A and 4B. To define the image display 300 in FIG. 3A, images A, B and C 310, 320, 330 are first scaled to have an equal height, e.g., total height $h_T$=100. The width of each image 310, 320, 330 is also scaled to maintain the aspect ratio of each image, as required by a display parameter. The total width of all of the images at equal height is then determined by the following equation:

a. $$w_T = \sum \left(\frac{w_i}{h_i} * h_T\right)$$ Equation 1

The resulting dimension, ($w_T$, $h_T$), establishes the aspect ratio of the photos as arranged in a horizontal photo strip. This dimension is then scaled relative to the image area 306 to occupy a maximum portion of the image area while maintaining the aspect ratio of the working dimension ($w_T$, $h_T$). In this instance, the dimension is scaled such that the total width of the images 310, 320, 330 equals the width of the image area 306. Thus, the total width of the images 310, 320, 330 on the image display 300 is maximized, thereby also maximizing the total portion of the display area 306 that the images 310, 320, 330 may occupy under the instant display parameters. As a further result of this arrangement, each of the images 310, 320, 330 is represented in the image display 300 in its entirety and with its original aspect ratio (from FIG. 3A) maintained.

Figure 3C:
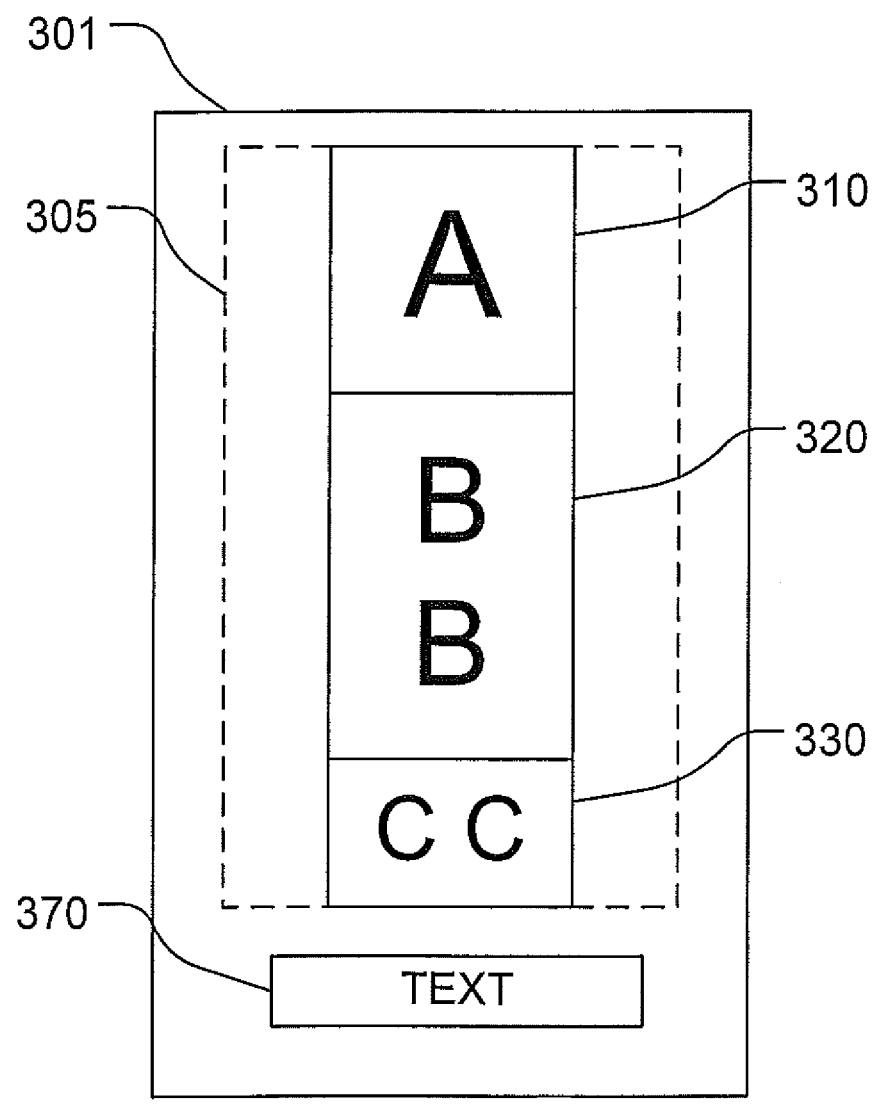
FIG. 3C is a representation of a product design having a vertical photograph strip produced by an embodiment of the present invention.

FIG. 3C illustrates an image display 301 having a vertical photo strip, where the images 310, 320, 330 are vertically aligned such that they occupy a single column along the length of the image area 305. This arrangement can be created under the same process described above with respect to FIG. 3B, with the exception that, in defining the arrangement, the dimensions of height and width of each image 310, 320, 330 are reversed. Specifically, the images 310, 320, 330 are scaled to have equal width, and the vertical arrangement of the scaled images is further scaled to occupy a maximum area within the image area 305.

Figure 4A:
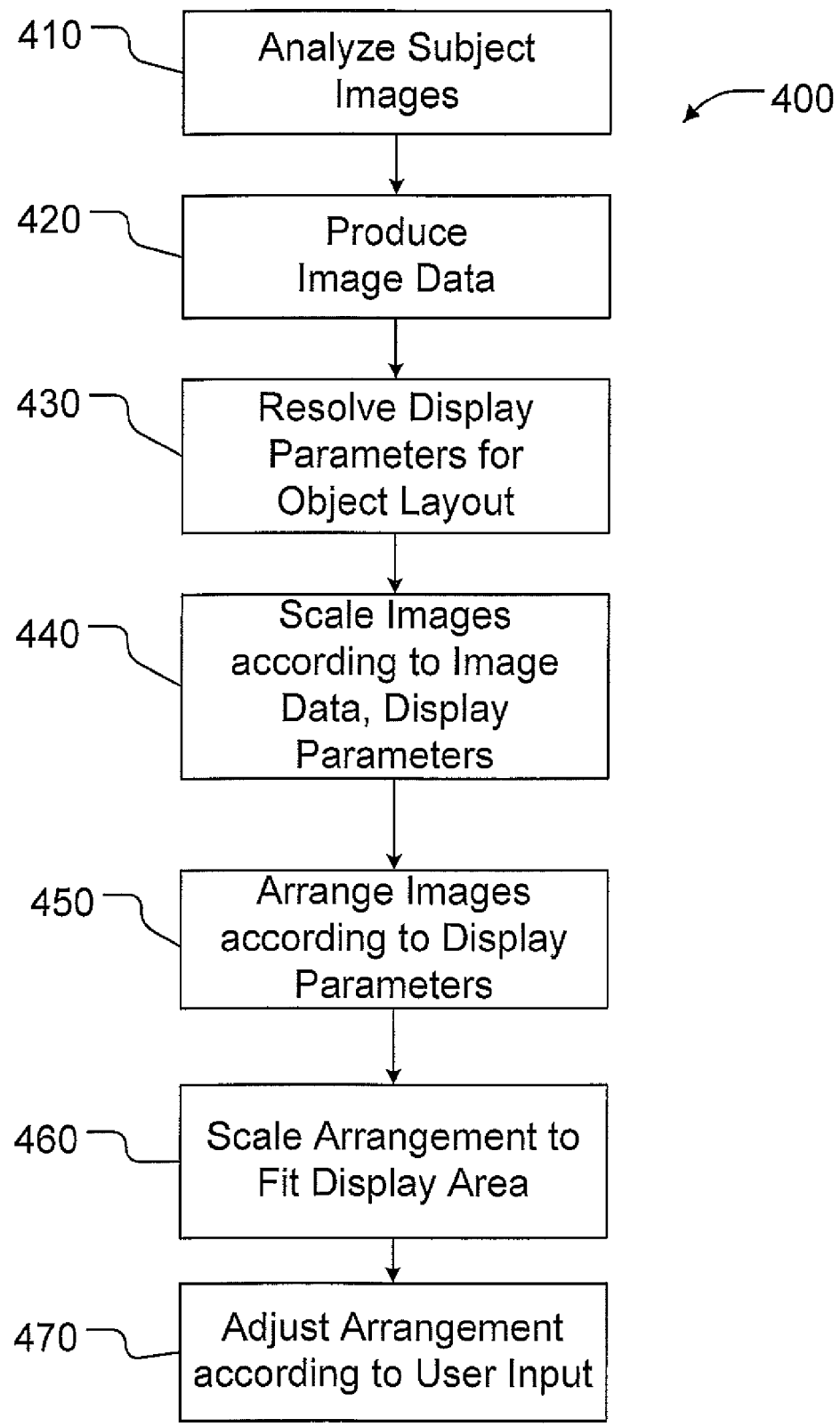
FIG. 4A is a flow diagram of an embodiment of the invention providing an arrangement of images on an image display.

FIG. 4A is a flow diagram of a process 400 of providing an arrangement of images on an image display according to the principles of the present invention. The process 400 may incorporate any of the techniques described above with respect to FIGS. 3A-3C, or may be implemented to produce an image display such as the image displays 300, 301 of FIGS. 3B and 3C. The process 400 may be implemented or executed by a computer application, such as the design tools 106 of FIG. 1, as directed by a computer-readable medium containing corresponding instructions.

Under this process 400, embodiments of the present invention analyze subject images to be arranged on a image display (410). The analyzing may include computing dimensions (height and width) or area of each image, as well as the number of images to be arranged. The dimensions of each image can be expressed as a number of pixels, relative dimensions, or linear measurements corresponding to the image display as a printed product. As a result of this analysis (410), image data is produced (420). The image data may include the aforementioned dimensions, in addition to other information relevant to arranging the images.

Further, display parameters are resolved for the object image display (430). Display parameters include any constraint on the ways in which images may be positioned within the image area of an image display, and are described in further detail above with reference to FIG. 3B. Embodiments of the invention may include a number of "design layouts" (not shown), where each layout includes a set of display parameters that are directed to a specific product design or design scheme. For example, a "photo strip" design layout may contain a number of display parameters, as described above with respect to FIG. 3B, for producing a photo strip image display 300. In resolving the display parameters, embodiments of the invention may select a design layout, implement a user-selected design layout, or accept a number of individual or user-generated display parameters.

Given the image data, embodiments of the invention may scale each of the images according to the resolved display parameters (440). For example, with reference to FIG. 3B, the display parameters may dictate that each of the images 310, 320, 330 be equal in height. As a result, the images 310, 320, 330 are scaled to a common, predetermined height, $h_T$, while maintaining the aspect ratio of each image 310, 320, 330. Next, the scaled images are arranged according to the display parameters (450). The display parameters may determine one or more ways in which the images can be positioned relative to one another. Referring again to FIG. 3B, for example, the display parameters may require that each image 310, 320, 330 be positioned adjacent to another image to form a single row of images as shown. Moreover, the scaled images may be arranged independent of an image area of a product design.

Given an image arrangement in accordance with the display parameters, embodiments of the invention scale the arrangement to fit within the display area of an image display (460). The scaling may be completed by observing the dimensions of the image area, and then scaling the entire arrangement (while maintaining aspect ratio of the arrangement) such that 1) at least one dimension of the arrangement (height or width) is equal to a respective dimension of the image area, and 2) no dimension of the arrangement is larger than the respective dimension of the image area. Referring to FIGS. 3B and 3C, for example, the arrangement of images 310, 320, 330 is scaled in FIG. 3B such that its width equals the width of the image area 306, and is scaled in FIG. 3C such that its height equals the height of the image area 305.

The scaled image arrangement is then positioned within the image area of an image display. If the image arrangement does not occupy the entire image area, it may be positioned according to a further constraint, for example, by centering the arrangement within the image area. Once positioned, the image arrangement may be presented, as a part of an image display, to a user via a computer interface, such as the computer display 140 in FIG. 1.

Embodiments of the invention may also be configured to enable user adjustments to the image arrangement (470). Such adjustment can be facilitated by an interface through which the user selects one or more of the images on the image display, and rearranges or repositions those images as desired. Adjustments could be enabled in any manner, or may be limited to configurations that satisfy the display parameters. For example, a user may view the image display 300 as shown in FIG. 3B. The user may adjust the sequence of images 310, 320, 330 of the photo strip, thereby replacing the image sequence A-B-C with the sequence A-C-B, B-C-A or B-A-C. This adjustment can be made within the design parameters. If the user is permitted to make adjustments without regard for the design parameters, then each of the images 310, 320, 330 may be positioned in any manner as directed by the user, for example by moving or rotating the images 310, 320, 330 on the image display 300. As a result of this process 400, embodiments of the present invention provide an image display that may be reproduced as a printed product design or an electronic image.

The process 400 described above is useful for defining an arrangement of images where the display parameters define the maximum dimensions of the arrangement, For example, in FIG. 3B, the maximum dimensions of the arrangement of the images 310, 320, 330 is defined as the common height and the total width of all of the images. As a result, the arrangement can be maximized in the image area 306 merely by scaling the arrangement as described above. In other embodiments, however, the display parameters may not determine the maximum dimensions of an image arrangement. In such cases, an image arrangement may not be the largest that is possible under the display parameters. Accordingly, the process 405 of FIG. 4B, described below, can be implemented to define a plurality of image arrangements, and then select the image arrangement to maximize at least one dimension of the arrangement.

Figure 4B:
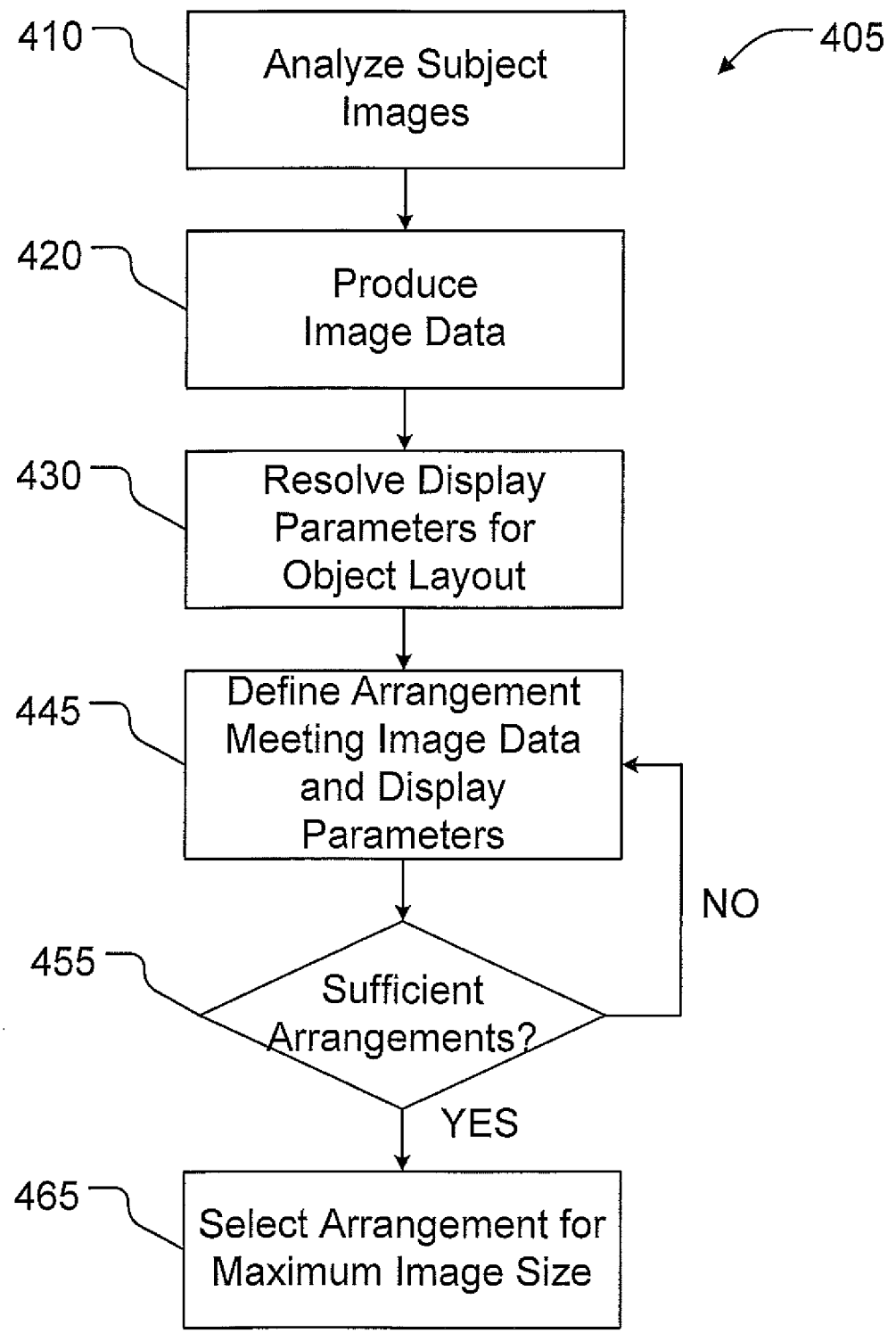
FIG. 4B is a flow diagram of a further process of providing an arrangement of images on an image display in accordance with the present invention.

FIG. 4B is a flow diagram of a process 405 of defining an image arrangement on an image display. The process 405 may be implemented or executed by a computer application, such as the design tools 106 of FIG. 1, as directed by a computer-readable medium containing corresponding instructions. The process 405 may incorporate some of the above process 400 of FIG. 4A. In particular, the process 405 analyzes the subject images (410) to produce image data (420), and resolves display parameters for the object layout (430) as described above. Based on the image data and display parameters, a first arrangement is defined such that the display parameters are satisfied (445). The particular method of defining the arrangement may depend on the resolved display parameters, as are described in further detail below with respect to FIGS. 5A-5E. Referring back to FIG. 4A, the defining (445) of FIG. 4B can include scaling the images prior to positioning (440), arranging the images according to the display parameters, and scaling the arrangement to fit the display area (450).

Once a first arrangement is defined, the process 405 confirms whether a sufficient number of arrangements have been defined (455). A required number of arrangements may be determined either by an algorithm or application executing the process 405, or may be defined as a display parameter. For example, a photo strip design layout (e.g., FIGS. 3B and 3C) positions the subject images in the same area consistently, and so a single arrangement is sufficient. In contrast, other design layouts may be produced by a number of random variations within the display parameters. Thus, multiple arrangements may need to be defined in order to select one having a satisfactory size or other metric. If a sufficient number of arrangements have not been reached, then the process 405 repeats defining an arrangement (445) to produce a second arrangement. This step (445) may be repeated a number of times until the requisite number of arrangements is met.

With a sufficient number of image arrangements, embodiments of the invention proceed to compare the arrangements by one or more metrics. In the process 405 shown, the arrangement is selected having the maximum image area (465). To do so, an application may calculate the total area of the images of each arrangement, and then select the arrangement with the largest total area. Alternatively, the arrangements may be compared and selected according to a different metric, such as the area of a particular image, or the total height or width of the images in each arrangement. The selected image arrangement is presented to a user via a computer interface, which may further enable the user to make manual adjustments to the arrangement.

One skilled in the art will recognize that the processes 400, 405 described above can be modified in a number of ways to achieve the same or a similar result of defining an arrangement of images on an image display.

FIGS. 5A-5E illustrate various image displays 500-504 having image arrangements that are defined according to different "design layouts," or sets of display parameters. Each of these arrangements may be produced by one or both of the processes 400, 405 described above with respect to FIGS. 4A and 4B, given the images A-E (510, 520, 530, 540, and 550) and the design parameters specific to the arrangement. Those design parameters are described below with respect to each image display 500-504. In each case, the respective design layouts may be modified by omitting or modifying one or more of the display parameters, or imposing additional display parameters. In the examples depicted in FIGS. 5A-5D, all images are sized such that they have the same area. Images with non-uniform sizes may also be employed in embodiments of the present invention.

Figure 5A:
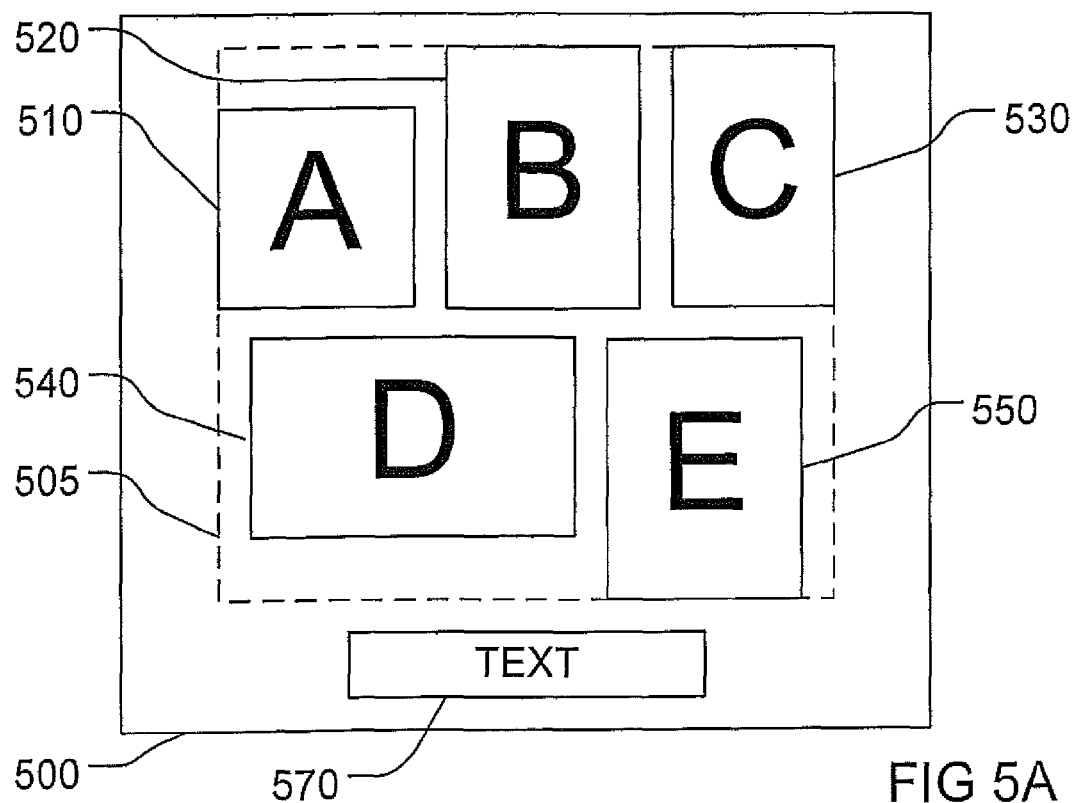
FIG. 5A is a representation of a uniform image arrangement produced by an embodiment of the present invention.

FIG. 5A illustrates an image display 500 having a "uniform photo arrangement" within the image area 505, with a text box 570 located below the image area 505. For this arrangement, the design parameters require the following:

1) The images are positioned in either rows or columns, depending on which arrangement allows images of the largest size. In the disclosed embodiment, images are divided into either two rows or two columns, but a greater number of rows or columns could be allowed, if desired.
2) All images are positioned with horizontal and vertical axes aligned to the respective axes of the image area 505.
3) The images are separated by a space of a fixed length, as exemplified by the gap between images A 510 and B 520 and the gap between images A 510 and D 540.
4) The images of each row are aligned to a horizontal axis either above or below the row, as shown by the top edge-alignment of images D 540 and E 550.
5) Each row is centered to the image area.

Under these display parameters, embodiments of the invention may produce an image display 500 as shown. Under the process 405 described above with respect to FIG. 4B, the display parameters may be used to define a number of image arrangements, and then selecting one or more of the image arrangements for presentation to a user as an image display 500.

Figure 5B:
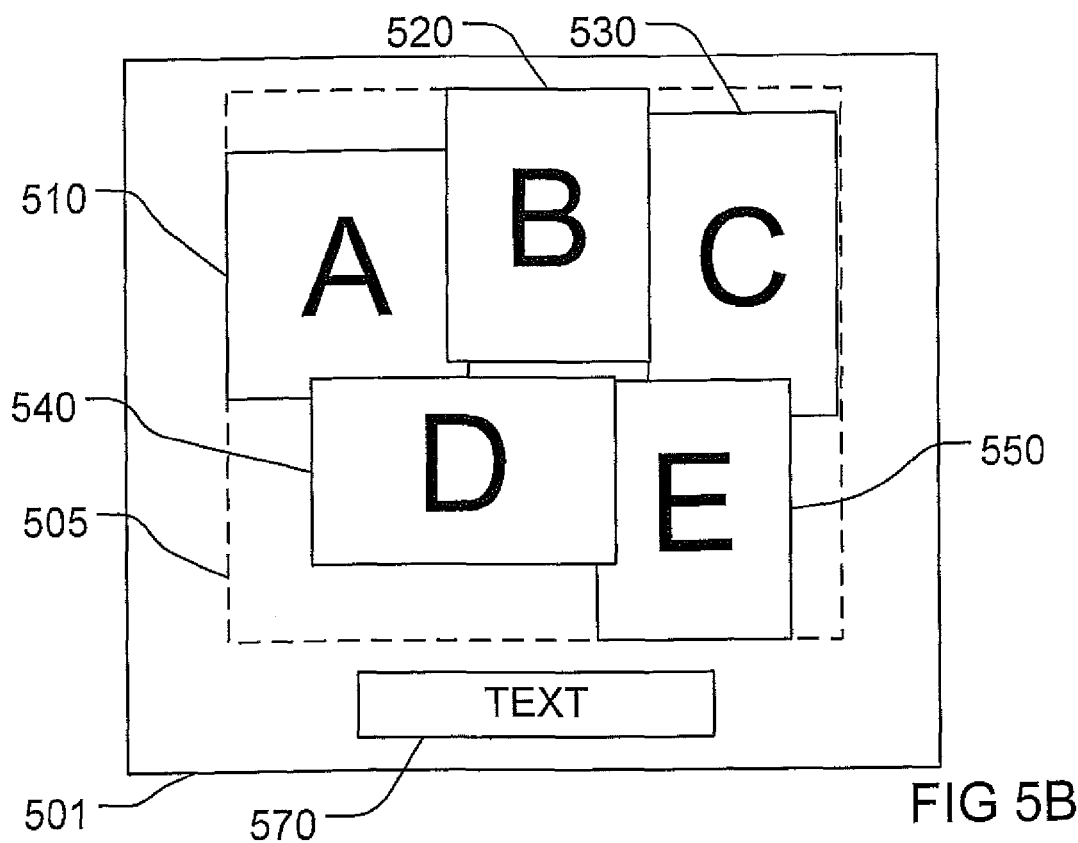
FIG. 5B is a representation of an image arrangement having overlap produced by an embodiment of the present invention.

FIG. 5B illustrates an image display 501 having an "overlap photo arrangement" within the image area 505. For this arrangement, the design parameters are comparable to display parameters (1), (2) and (5) described above with reference to FIG. 5A, with the addition of a display parameter allowing for a degree of overlap between the photos. Display parameters may also determine the range of overlap permitted, as well as the placement of images above and below one another.

In a particular embodiment of an "overlap photo arrangement," display parameters may define an arrangement as follows:
1) If there is an even number of photos, then the same number must be in row one as row two. If there are an odd number of photos, then the two rows must vary by only one photo.
2) If there is an even number of photos, then the rows are shifted in the following way:
   If the first row is shorter, it is moved to the left so that its left edge is just to the left of the first photo in the second row.
   If the second row is shorter, it is moved to the right so that its right edge is just to the right of the last photo in the first row.
   In either case, the entire arrangement is recentered after this adjustment.
3) The spacing between rows is negated; that is, the photos overlap by as much as they used to have for spacing between the rows.
4) The z-index of the photos is such that ones on the right appear to be "on top of" ones to the left of them.

Figure 5C:
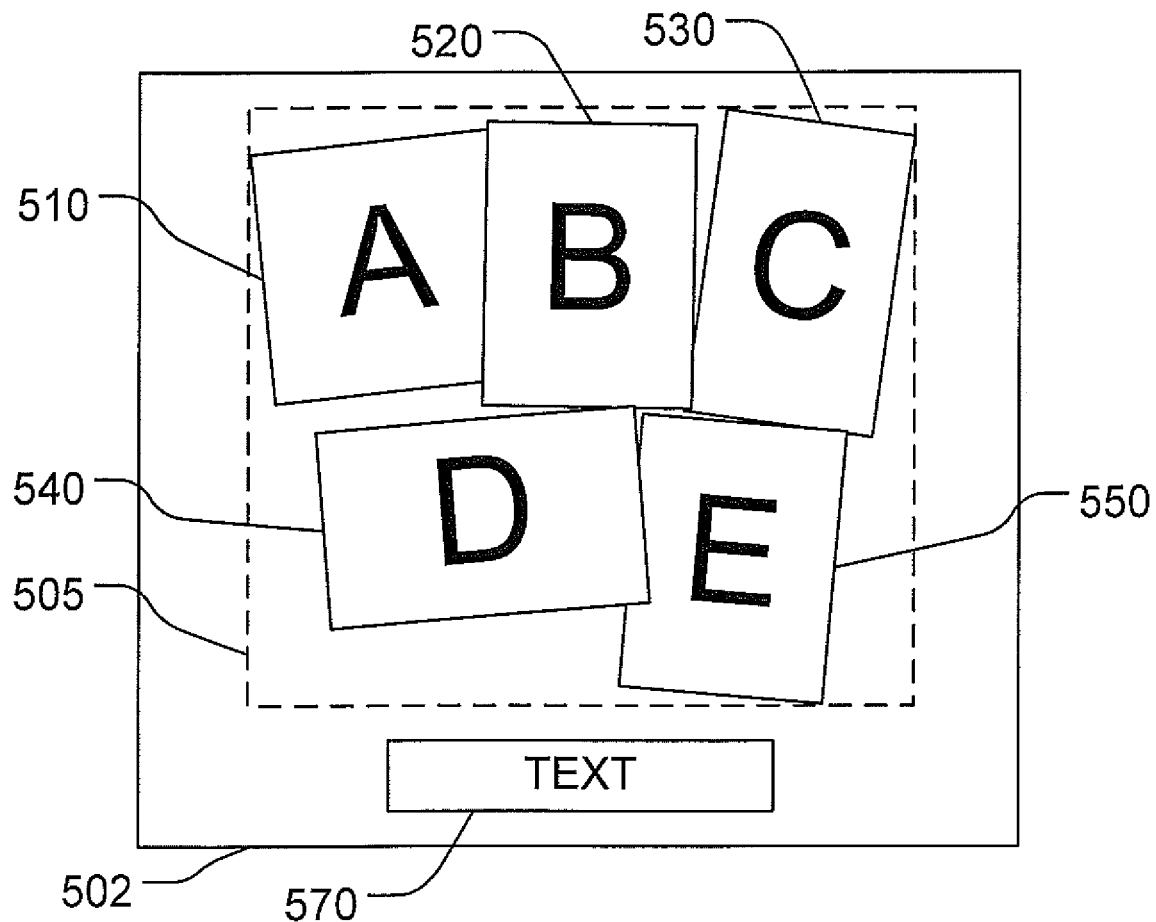
FIG. 5C is a representation of an image arrangement having rotation produced by an embodiment of the present invention.

FIG. 5C illustrates an image display 502 having a "scatter photo arrangement" within the image area 505. This arrangement can be obtained in a number of ways. For example, an application may implement the design parameters of the "uniform photo arrangement" first to create an image display 500 as shown in FIG. 5A. Each of the images 510-550 may then be rotated while maintaining respective centers of the images stationary within the image area. The display parameters may include a static list of angles by which to rotate each of the images, rotation being about respective centers. Alternatively, the display parameters may include a range of permissible angles by which to rotate the images (e.g., between 1 and 10 degrees), whereby each image is rotated by a random angle within that range.

As a result of rotating the images 510-550, one or more portions of the images 510-550 may be located outside of the image area 505. This extension may either be permitted in the image display 502, or the image arrangement may be scaled in order to fit within the image area.

Figure 5D:
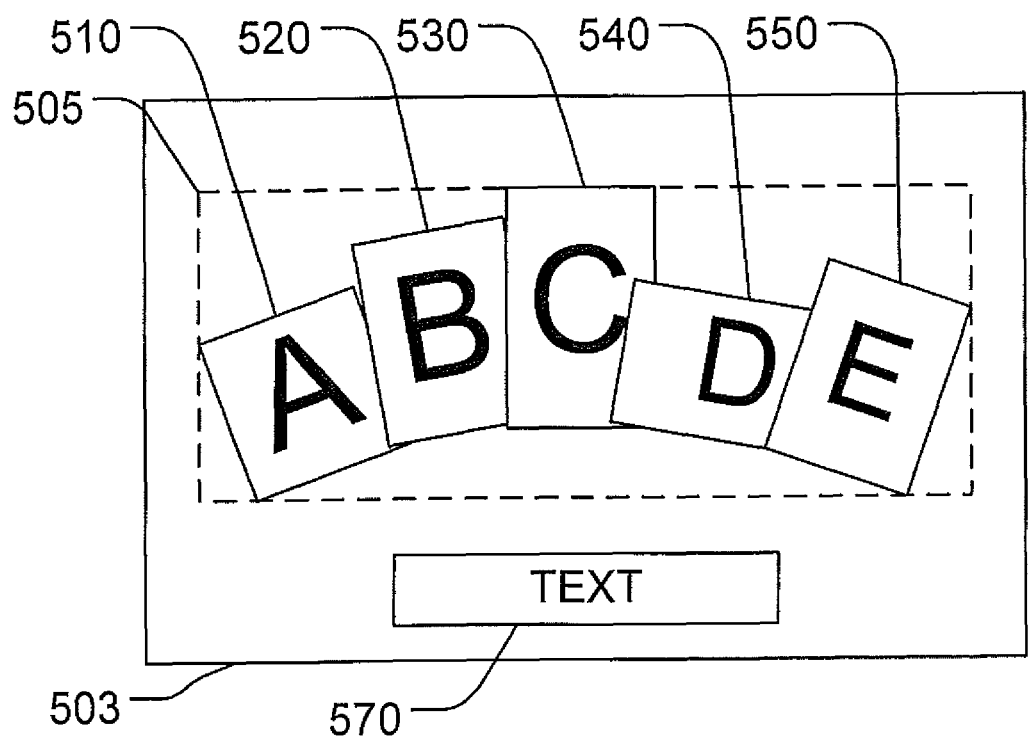
FIG. 5D is a representation of a fanned image arrangement produced by an embodiment of the present invention.

FIG. 5D illustrates an image display 503 having a "fan photo arrangement" within the image area 505. This arrangement may be completed by a process such as the process 400 of FIG. 4A, where the display parameters provide instructions as follows:
1) Scale the images 510-550 to be uniform in area.
2) Compute the average width of the scaled images.
3) Produce a circle having a radius equal to three times the average width of the scaled images. The radius of the circle can be adjusted to provide different curvature to the alignment of the fanned images.
4) Position the images around the edge of the circle at fixed intervals. The interval between each image can be adjusted to accommodate images of varying widths, or to provide varying degrees of overlap between photos.

Once the images 510-500 are positioned as such, the arrangement of the images 510-550 can be scaled, while maintaining aspect ratio of the images, to fit within the image area 505.

Figure 5E:
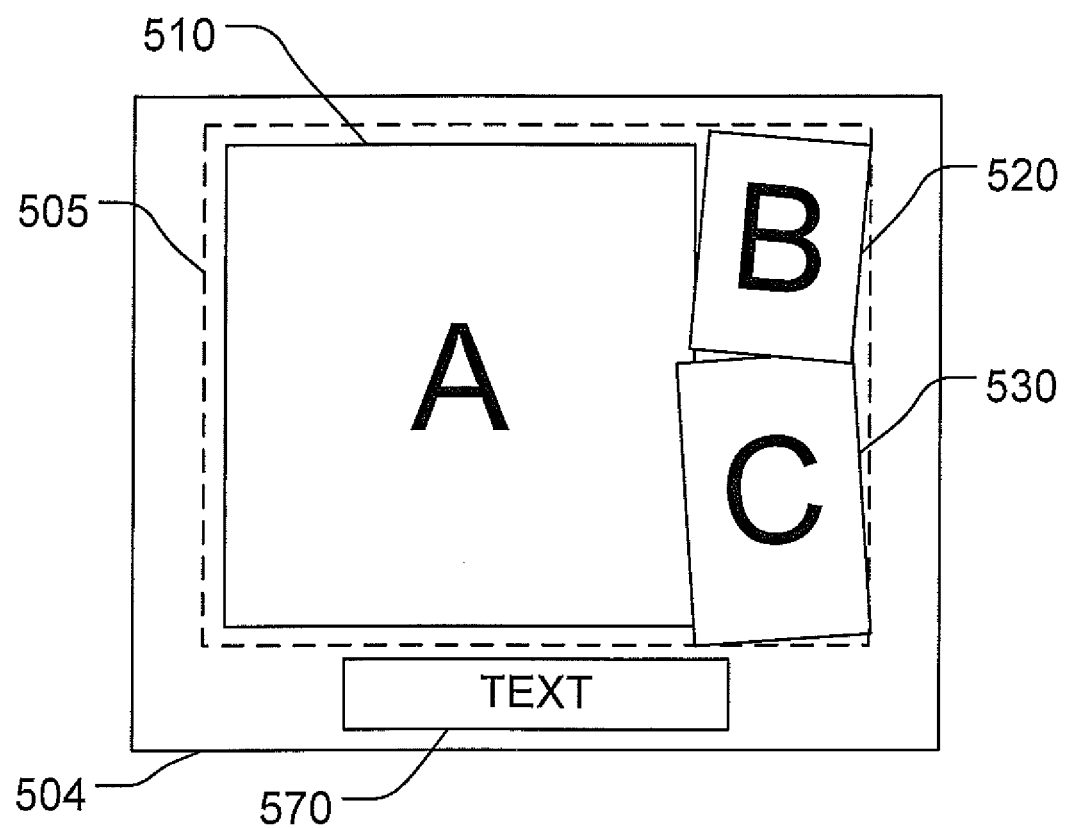
FIG. 5E is a representation of a large photo arrangement produced by an embodiment of the present invention.

FIG. 5E illustrates an image display 504 having a "large photo arrangement" within the image area 510. In this design layout, the display parameters require one image to be selected as the "primary image," while the remaining images occupy a smaller area in a "photo strip arrangement." Here, image A 510 is the primary image, while images B and C 520, 530 are the small images. Images B and C 520, 530 are first arranged in a "vertical photo strip" as described above with respect to FIG. 3C. Yet rather than position the images as shown in the image display 301 of FIG. 3C, images B and C 520, 530 are positioned to the right of the image area 505, rotated at differing angles, and scaled to occupy the upper and lower bounds of the image area 505.

With images B and C 520, 530 positioned as a vertical photo strip, image A 510 is scaled so that its height matches the height of the photo strip. Additional display parameters may be imposed on image A 510, such as limits on the width or the area of the image 510 relative to the height or area of images B and C 520, 530. The scaled image A 510 is then positioned within the image area 505 such that the smaller images 520, 530 overlap by a degree determined by the design parameters.

Figure 6:
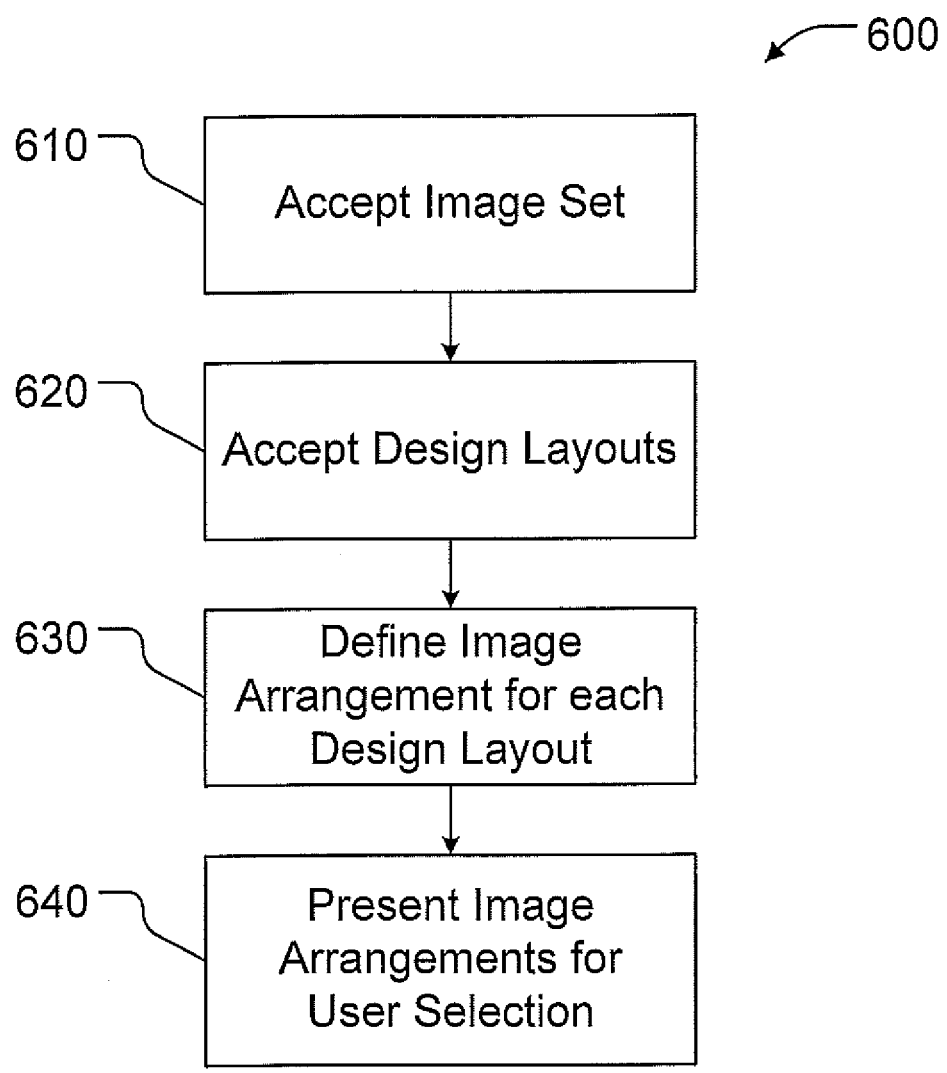
FIG. 6 is a flow diagram of a process of providing multiple image displays for presentation to a user in the present invention.

FIG. 6 illustrates a flow diagram of a process 600 for providing a plurality of image arrangements to enable user selection of the arrangements. An application completing this process 600 first accepts a set of images (610), such as images A-E 510-550 as shown in FIGS. 5A-5E. The application also accepts or otherwise determines a plurality of design layouts to be implemented (620). The design layouts may include, for example, sets of design parameters directed to one or more of a "photo strip" arrangement, a "uniform image arrangement," an "overlap photo arrangement," a "scatter image arrangement," a "fan photo arrangement," and a "large photo arrangement" as described above with respect to FIGS. 3A-C and 5A-E. Given the image set and design layouts, an image arrangement is defined for each design layout according to the display parameters of the respective design layout (630). Defining each image arrangement may be completed, for example, by one of the processes 400, 405 described above with respect to FIGS. 4A and 4B. Each defined image arrangement is then presented, as part of a respective image display, to a user via a computer interface (640). The image displays corresponding to all of the design layouts may be presented on a single page of a user interface, e.g., by presenting a reduced-size ("thumbnail") view of each image display. As a result, the user may quickly view and select from several possible arrangements of the set of images, selecting one or more of the image displays to produce as a printed or electronic design.

Embodiments of the present invention may be implemented in hardware, software, firmware or combinations thereof. A computer system implementing the above described features of the present invention may be configured as a single or plural processors, parallel processors, client-server networked computers and other computer configurations.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for positioning a plurality of images in an image area of an electronic product design, the method comprising:
   analyzing the plurality of images to produce image data, the image data comprising at least one of the aspect ratio and the height and width dimensions of each image of the plurality of images and the number of the plurality of images;
   receiving a set of display parameters which specify one or more constraints on how the plurality of images may be positioned and displayed within the image area the one or more constraints comprising one or more of a relative width, height, or area of the displayed images, alignment of the images, number of rows or columns of the images, maximum or minimum overlap of images, angle or rotation of the images, and/or frames encompassing one or more of the images;
   arranging the plurality of images, independent of the image area of the electronic product design, based on the image data and the display parameters to generate an arrangement of the plurality of images such that the one or more constraints imposed by the display parameters are satisfied; and
   scaling the arrangement as a whole to fit the image area such that at least one of the height and the width dimension of the arrangement is maximized so as to substantially fill at least one of a corresponding at least one of the height dimension and the width dimension of the image area and neither the height dimension nor the width dimension of the arrangement is larger than the corresponding dimension of the display area.

2. The method of claim 1, wherein generating the arrangement includes defining a scale and position within the image area for each image of the plurality of images.

3. The method of claim 1, wherein generating the arrangement comprises:
   generating, based on the display parameters, a first arrangement within the image area for the plurality of images according to the display parameters;
   generating, based on the display parameters, a second arrangement within the image area for the plurality of images; and
   determining one of the first and second arrangements to provide a greater height or width dimension of the arrangement.

4. The method of claim 1, wherein generating the arrangement comprises:
   scaling each image of the plurality of images according to the display parameters to produce a plurality of scaled images;
   determining an arrangement of the plurality of scaled images such that the display parameters are satisfied; and
   scaling the arrangement of the plurality of scaled images relative to the image area.

5. The method of claim 1, wherein generating the arrangement includes maintaining an aspect ratio of each image of the plurality of images.

6. The method of claim 1, wherein the display parameters include a number of permissible rows or columns in which to position the plurality of images.

7. The method of claim 1, wherein generating the arrangement includes rotating at least one image of the plurality of images by an angle according to the display parameters.

8. The method of claim 1, wherein the display parameters include a maximum or minimum overlap of images.

9. The method of claim 1, further comprising positioning a frame within the display area to encompass at least one image of the plurality of images.

10. The method of claim 1, wherein generating the arrangement includes determining an arrangement of the plurality of images such that the plurality of images occupy a maximum area of the display area.

11. The method of claim 1, wherein generating the arrangement includes scaling each image of the plurality of images to a common dimension.

12. The method of claim 1, wherein generating the arrangement includes aligning at least a subset of the plurality of images to an axis.

13. The method of claim 1, wherein generating the arrangement includes scaling each image of the plurality of images to occupy substantially equal area within the image area.

14. A non-transitory computer-readable medium comprising instructions that, when executed by a computer system, cause the computer system to:
   analyze the plurality of images to produce image data, the image data comprising at least one of the aspect ratio and the height and width dimensions of each image of the plurality of images and the number of the plurality of images;
   receive a set of display parameters which specify one or more constraints on how the plurality of images may be positioned and displayed within the image area, the one or more constraints comprising one or more of a relative width, height, or area of the displayed images, alignment of the images, number of rows or columns of the images, maximum or minimum overlap of images, angle or rotation of the images, and/or frames encompassing one or more of the images;
   arrange the plurality of images, independent of the image area of the electronic product design, based on the image data and the display parameters to generate an arrangement of the plurality of images such that the one or more constraints imposed by the display parameters are satisfied; and
   scaling the arrangement as a whole to fit the image area such that at least one of the height and the width dimension of the arrangement is maximized so as to substantially fill at least one of a corresponding at least one of the height dimension and the width dimension of the image area and neither the height dimension nor the width dimension of the arrangement is larger than the corresponding dimension of the display area.

15. The non-transitory computer-readable medium of claim 14, wherein generating the arrangement includes defining a scale and position within the image area for each image of the plurality of images.

16. The non-transitory computer-readable medium of claim 14, wherein generating the arrangement comprises:
   generating, based on the display parameters, a first arrangement within the image area for the plurality of images according to the display parameters;
   generating, based on the display parameters, a second arrangement within the image area for the plurality of images; and
   determining one of the first and second arrangements to provide a greater dimension of the plurality of images.

17. The non-transitory computer-readable medium of claim 14, wherein generating the arrangement comprises:
- scaling each image of the plurality of images according to the display parameters to produces a plurality of scaled images;
- determining an arrangement of the plurality of scaled images such that the display parameters are satisfied; and
- scaling the arrangement of the plurality of scaled images relative to the image area.

18. The non-transitory computer-readable medium of claim 14, wherein generating the arrangement includes maintaining an aspect ratio of each image of the plurality of images.

19. The non-transitory computer-readable medium of claim 14, wherein generating the arrangement includes determining an arrangement of the plurality of images such that the plurality of images occupy a maximum area of the image area.

20. The non-transitory computer-readable medium of claim 14, wherein generating the arrangement includes scaling each image of the plurality of images to a common dimension.

\* \* \* \* \*